United States Patent
Sees et al.

(10) Patent No.: US 6,222,821 B1
(45) Date of Patent: Apr. 24, 2001

(54) SYSTEM AND METHOD FOR RECONFIGURING A TELECOMMUNICATIONS NETWORK TO ITS NORMAL STATE AFTER REPAIR OF FAULT

(75) Inventors: Mark Wayne Sees, Plano; Will Russ, Dallas; Lee Dennis Bengston, Murphy; Clinton Allen Wagner, Allen, all of TX (US)

(73) Assignee: MCI Communications Corporation, Washington, DC (US)

( * ) Notice: Subject to any disclaimer, the term of this patent is extended or adjusted under 35 U.S.C. 154(b) by 848 days.

(21) Appl. No.: 08/493,741

(22) Filed: Jun. 22, 1995

(51) Int. Cl.⁷ .............................. H04J 3/14; H04L 12/26
(52) U.S. Cl. ........................................ 370/227; 340/827
(58) Field of Search .......................... 370/16, 16.1, 58.1, 370/58.2, 60, 60.1, 216, 217, 221, 225, 226, 227–228

(56) References Cited

U.S. PATENT DOCUMENTS

| | | |
|---|---|---|
| 3,835,260 | 9/1974 | Prescher et al. ............ 379/237 |
| 4,704,714 | 11/1987 | Tomizawa et al. . |
| 4,956,835 * | 9/1990 | Grover ........................ 370/16 |
| 5,058,105 | 10/1991 | Mansour et al. . |
| 5,138,609 | 8/1992 | Hashimoto . |
| 5,146,452 | 9/1992 | Pekarske . |
| 5,182,744 | 1/1993 | Askew et al. . |
| 5,241,534 | 8/1993 | Omuro et al. . |
| 5,319,632 * | 6/1994 | Iwasaki .......................... 370/16 |
| 5,398,236 | 3/1995 | Hemmady et al. . |
| 5,459,716 * | 10/1995 | Fahim et al. .................. 370/16 |

* cited by examiner

Primary Examiner—Hassan Kizou

(57) ABSTRACT

To revert the topology of a network to its original or normal state after an alternate route has been found for bypassing traffic away from a malfunctioned link that has since been repaired, an Operation Support System (OSS) sends to each of the custodial sender/chooser nodes and the tandem nodes that form the alternate route respective commands to revert the operation(s) that each node had performed during distributed restoration. The OSS is able to identify the custodial nodes by the fact that those nodes perform more operations than the tandem nodes. The operations that were performed during the distributed restoration process were recorded and the thus restored topology of the network is mapped and stored. Upon receipt from the different nodes that the malfunctioned link has been repaired, the OSS sends to each of the nodes a specific command to perform the inverse of the operation(s) that that node had performed during the restoration. The custodial nodes are ordered to perform their inverse operations first so that the malfunctioned link that has since been repaired once again connects the custodial nodes. A path verification process is next performed to ensure the integrity of the newly repaired path. Once the integrity of the repaired path is confirmed, each of the tandem nodes performs the inverse of the operation it had performed during the distributed restoration to disconnect the cross connected ports within each of the tandem nodes.

42 Claims, 8 Drawing Sheets

SYSTEM AND METHOD FOR RECONFIGURING A TELECOMMUNICATIONS NETWORK TO ITS NORMAL STATE AFTER REPAIR OF FAULT

RELATED APPLICATIONS

This invention is related to an application by Russ et al. entitled "Method and System for Resolving Contention of Spare Capacity Circuits of a Telecommunications network", to be assigned to the same assignee as the instant invention and filed on Jun. 6, 1995 having Ser. No. 08/468,302. This invention also relates to an application by W. Russ entitled "System and Method for Resolving Substantially Simultaneous Bi-directional Requests of Spare Capacity", filed on Jun. 7, 1995 having Ser. No. 08/483,578. This invention is further related to an application by Russ et al. entitled "Automated Path Verification for SHN-Based Restoration", filed on Jun. 7, 1995 having Ser. No. 08/483,525. This invention is furthermore related to an application by W. Russ entitled "Automated Restoration of Unrestored Link and Nodal Failures", filed on Jun. 7, 1995 having Ser. No. 08/483,579. This invention is yet furthermore related to an application by J. Shah entitled "Method and System for Identifying Fault Locations in a Communications Network", filed on Jun. 7, 1995 having Ser. No. 08/481,984. The aforenoted co-pending applications, all of which being assigned to the same assignee as the instant invention, are incorporated by reference herein. This invention is moreover related to an application by Russ et al. entitled "System and Method Therefor of Estimating an Optimal Amount of Spare Capacity for a Distributed Restoration Scheme", filed on Jun. 22, 1995 and having Ser. No. 08/493,477.

FIELD OF THE INVENTION

The present invention relates to distributed restoration of a telecommunications network in response to a failure therein and specifically relates to the normalization of the network after the fault has been repaired.

BACKGROUND OF THE INVENTION

A self healing network (SHN) distributed restoration algorithm (DRA) restores traffic that has been disrupted by a fault in a telecommunications network by finding an alternate route (alt route) to carry the traffic to bypass the fault. Such SHN DRA scheme is amply described by the aforenoted co-pending applications. In brief, the alt route is established by interconnecting a number of spare links connecting different nodes of the network so that traffic may be rerouted through those spare links. These spare links may be referred to as spare capacity and they are purposely added to the telecommunications network to provide the network the ability to perform restoration. But this spare capacity has to be somewhat limited due mostly to economic considerations. Thus if, after restoration, the network were to remain in the topology which includes the use of the spare links, the ability of the network to restore traffic due to other failures is curtailed. In other words, the spare capacity provides a safety margin for distributed restoration to take place. Yet once the spare capacity or some portion of it has been used, the safety margin could be diminished to the point that it no longer exists unless the topology of the network is restored to its normal state, i.e. prior to the failure, so that subsequent restorations may be effected with confidence for future failures.

Currently, when there is an outage due to a malfunctioned fiber, once the fiber is repaired, technicians have to manually reconnect at each of the cross-connect switches of the telecommunications network the different working and spare links. And the technicians at each of the cross-connect switches that might have been affected by the malfunctioned fiber need to refer to a pre-plan drafted in anticipation of the fault and follow instructions therein to connect/disconnect the various ports of the switch, in order to return the cross connect switch to its pre-failure state. Needless to say, this process is quite laborious and is subject to operator mistakes, not to mention requiring a substantial amount of repair time.

BRIEF SUMMARY OF THE INVENTION

To provide an automatic reconfiguration or reversion of the network to the topology it had prior to the occurrence of a fault, during the restoration process each operation performed by each of the nodes of the network is recorded by a central controller which may be an Operations Support System (OSS). A topology of the network may include the identification of all of the nodes of the network, the identity of the various ports of the cross-connect switch of the node, and how the various ports are cross-connected within each switch. The OSS further monitors any alarm signals from each node of the network.

When a fault occurs, and the custodial nodes that bracket the fault sense the fault alarm, distributed restoration begins. The process of the various steps of the restoration process are monitored by the OSS so that each connect/disconnect operation effected by each cross-connect switch is recorded. Consequently, since the establishment of an alt route requires both custodial nodes and tandem nodes, the operations of all of those nodes are recorded.

After the traffic is restored, to ensure that the spare capacity of the network is not diminished, the malfunctioned link, which may be in the form of a SONET optical carrier level 12 (OC-12) channel for example, is physically located and action to repair the link is undertaken. The repair of the malfunctioned link is also monitored by the OSS so that once the repair is finished, it will sense an alarm clearing signal from the now restored link.

Once the OSS is sure that there are no other malfunctioned links in the network, it scans its memory to find the custodial nodes by looking for nodes that had performed multiple, for example 2, connect/disconnect operations. The OSS furthermore retrieves from its memory data relating to tandem nodes that had performed a single operation for acting as a part of the alt route for rerouting the traffic. Since each operation is recorded and the identity of each of the reconfigured ports in each of the cross-connect switches is likewise recorded the OSS can effect an automatic process for reverting the topology of the network to its pre-failure or normal state by inverting the various operations. The nodes that had performed two operations are deemed to be the custodial nodes that bracketed the malfunctioned link. Those nodes that had performed a single operation for rerouting the traffic are deemed to be the tandem nodes of the alt route.

To revert the topology of the network to its state before the occurrence of the fault, the ports in each of the custodial nodes are reconfigured so that the now restored link is again to be used to route traffic between the two custodial nodes. The path of the thus restored original route is next verified to ensure its integrity. After the integrity of the reverted path has been confirmed by the verification process, the respective connections in each of the tandem nodes are disconnected so that the spare links that interconnected those tandem nodes for rerouting the traffic are once more restored and ready to be called upon for the next restoration in response to the next fault.

The present invention therefore has the objective of providing a system and method for automatically reconfiguring the topology of a telecommunications network back to its normal state after a distributed restoration due to a fault in the network, and the repair of that fault.

The present invention has yet another objective of providing a telecommunications network a 100% spare capacity reserve once a malfunctioned fiber has been repaired so that restoration of future faults are not hampered by lack of spare capacity.

BRIEF DESCRIPTION OF THE DRAWINGS

The above mentioned objectives and advantages of the present invention will become apparent and the invention itself will be best understood by reference to the following description of an embodiment of the invention taken in conjunction with the accompanying drawings, wherein.

DETAILED DESCRIPTION OF THE PRESENT INVENTION

Figure 1:
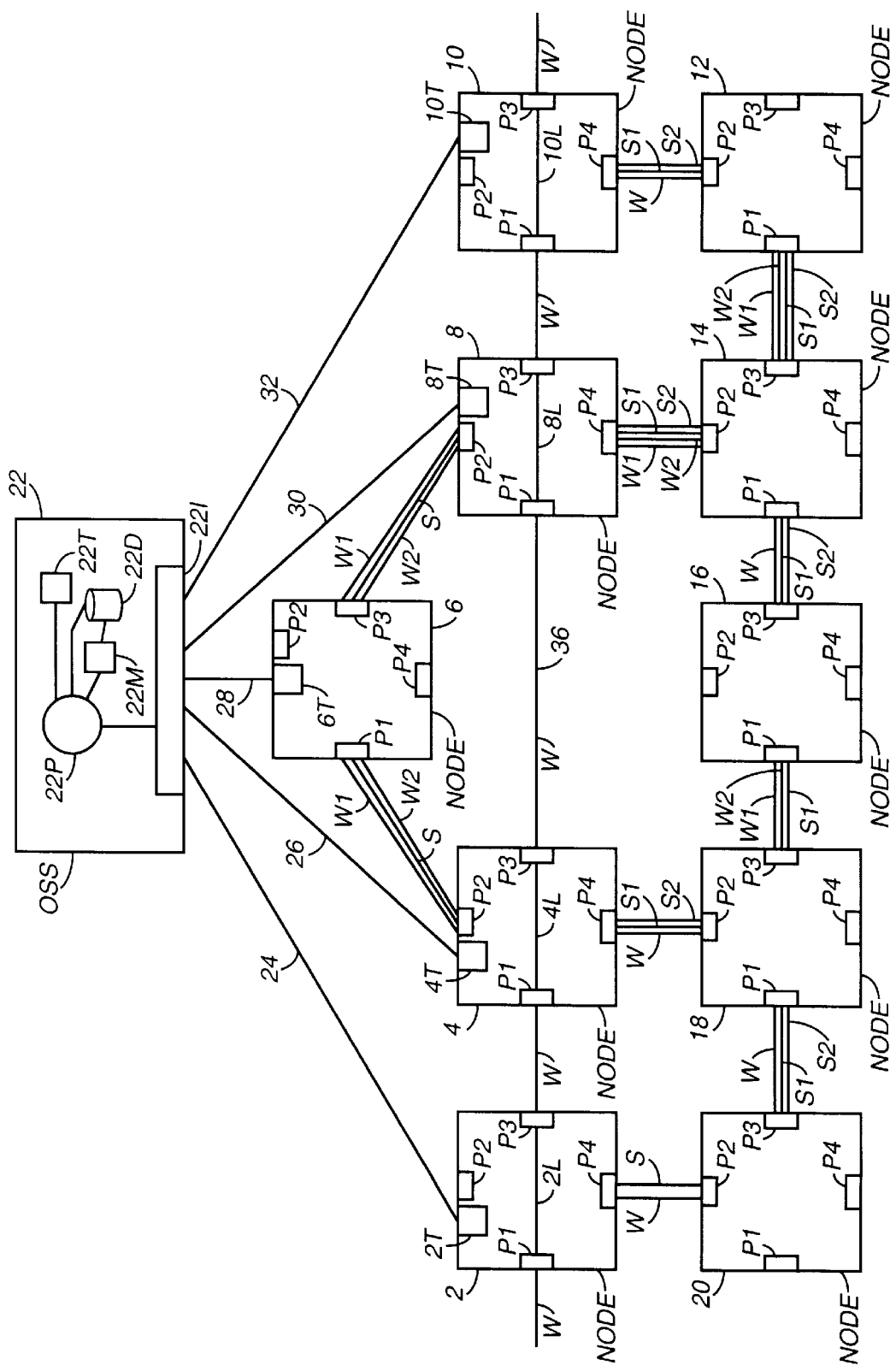
FIG. 1 illustrates a partial topology of a telecommunications network having a number of interconnected nodes and an Operations Support System (OSS)

An exemplar telecommunications network, as shown in FIG. 1, has a number of nodes 2–20 interconnected by a plurality of spans. For the instant invention, each span is defined to contain a set of links between two nodes. Some of these links are working links while others are spare links or reserve links. For example, in the network of FIG. 1, there are four links connecting node 8 to node 14. Two of these links, namely W1 and W2, may be considered for this example embodiment to be working links. The other two links, namely S1 and S2, are for the purpose of this invention spare links. Note that there may not necessarily be the same number of links connecting two adjacent or adjoining nodes. For example, even though there are four links connecting node 8 to node 14 and node 14 to node 12, there are only 3 links connecting node 4 to node 18, node 18 to node 16, node 18 to node 20, and node 16 to node 14.

For the span connecting node 4 to node 18, link W is deemed to be the working link while links S1 and S2 are the spare links. The respective working and spare links connecting nodes 12 and 14, nodes 14 and 16, nodes 16 and 18, and nodes 18 and 20 are likewise labeled in FIG. 1.

Albeit multiple links in actuality connect adjacent nodes, for the sake of simplicity, nodes 2, 4, 8 and 10 are each shown to be connected only by a single working link. For example, respective links W connect nodes 2 to node 4, node 4 to node 8, and node 8 to node 10. Although not shown, other nodes are connected by respective working links W to nodes 2 and 10.

For the FIG. 1 embodiment, each of the nodes is shown to have a number of ports, identified for example as P1, P2, P3 and P4. For the FIG. 1 topology which is before any fault has occurred, an exemplar path or route is identified by the interconnection of the working links through nodes 2, 4, 8 and 10. Note that each of the nodes in actuality may be a digital cross-connect switch (DCS) such as the model 1633-SX made by Alcatel Network Systems, Inc. Thus, for the example route shown in FIG. 1, the respective ports P1 and P3 are cross-connected in each of nodes 2, 4, 8, and 10 so that traffic may be routed therethrough.

The goings on and specifically the operations and the respective status of each of the nodes of the network are monitored by an Operations Support System (OSS) 22. OSS 22 in essence is a controller that oversees the network and includes in particular a processor 22P, a memory 22M and a database 22D. Memory 22M and database 22D are connected to processor 22P so that data being monitored by OSS 22 can be stored in either or both of those storage devices. Long term information may be stored in database 22D while working data is stored in memory 22M. The monitoring and recording of events and operations of the various nodes of the network are done by means of communications links connecting OSS 22 to each of the nodes of the network. For the sake of simplicity, only nodes 2 to 10 are shown to be respectively connected to OSS 22 via communications links 24 to 32.

The interfacing between communications links 24 to 32 are done by means of an interface unit 22I internal of OSS 22. Respective transceivers 2T to 10T are provided in nodes 2 to 10 to enable the nodes to communicate with OSS 22. In each of the nodes there is an administrative processor that provides the proper protocol to messages and signals that are being transceived between the node and OSS 22. Such administrative processor, although not explicitly shown, is resident in the interface unit of each of the nodes. Thus, OSS 22 can monitor, on a continuous basis, the operations of each of the nodes of the network.

In addition, given that OSS 22 is connected to each of the nodes, it can record at any time the topology of the network, as the identity of each of the nodes, as well as the ports that are cross-connected in each of the nodes, are provided as data via the respective communications links to OSS 22. The thus collected data may be stored in either memory 22M or database 22D. In any case, the data may be stored as a map or topology of the network. The topology of the network of FIG. 1, given that there are no faults occurring, represents a normal state of the network in which traffic is being routed through different paths or routes throughout the network. The FIG. 1 topology is stored in OSS 22.

To provide input/output between OSS 22 and the management of the network, there is further provided in OSS 22 a terminal 22T which enables a network operator to interface with OSS 22, and thereby monitor the network if desired, and reconfigure the various interconnections between the nodes for creating or eliminating routes within the telecommunications network.

Figure 2:
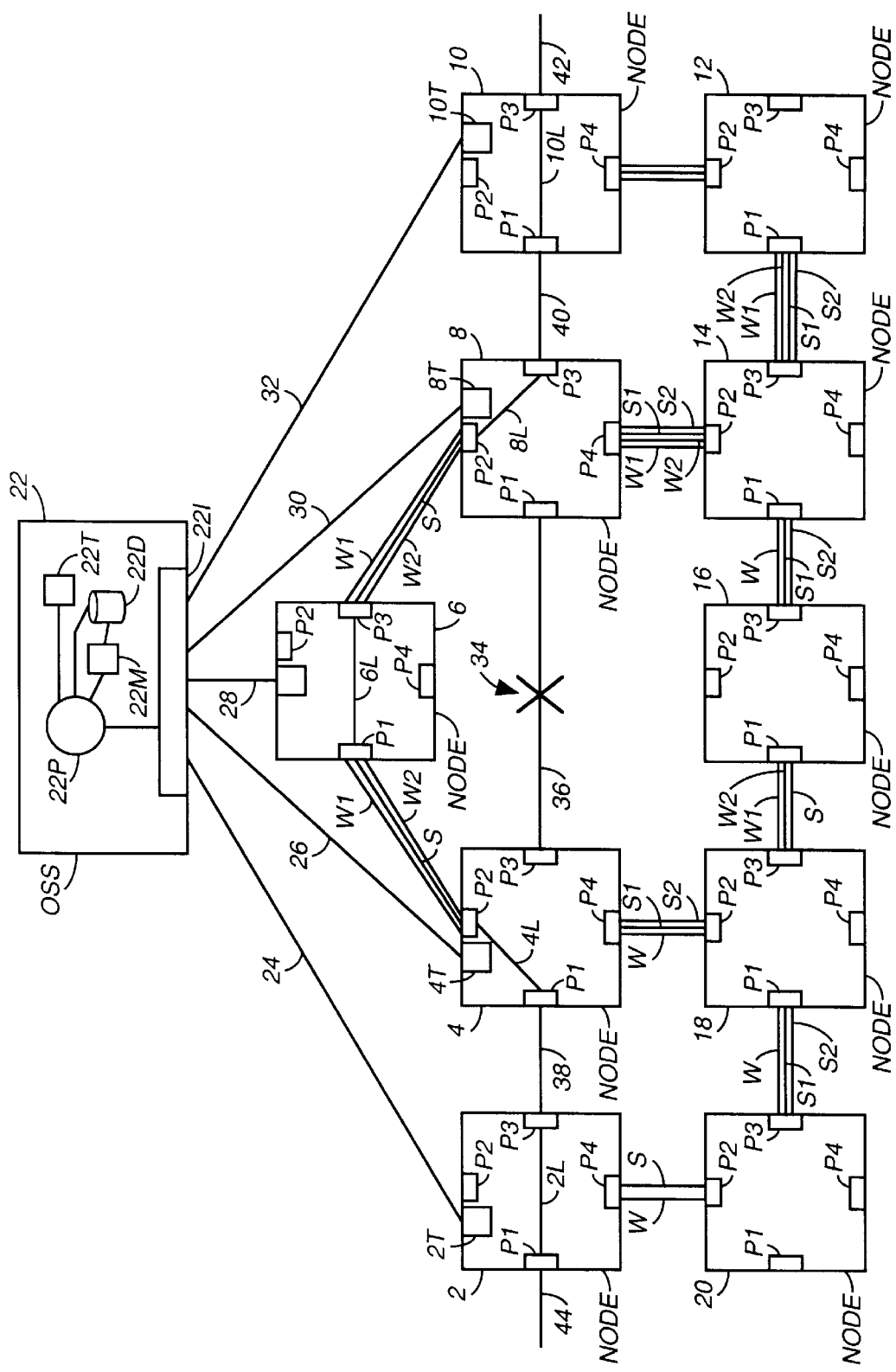
FIG. 2 repeats the FIG. 1 illustration but in addition shows a fault occurring at a link in the telecommunications network and the rerouting of traffic by means of an alt route.

With reference to FIG. 2, a fault is shown to have occurred at 34 on the OC-12 link 36 connecting nodes 4 and 8. Given that there is a detector at the interface unit where the interfacing ports are for each of the nodes, the fault at location 34 is detected by both nodes 4 and 8, specifically by port 3 of node 4 and port 1 of node 8. When port 3 of node 4 detects a malfunction on link 36, it reports this malfunction to OSS 22 as an alarm indication signal (AIS). Similarly, port 1 of node 8 reports an AIS to OSS 22.

Upon receipt of the respective AISs, nodes 4 and 8 each begin the distributed restoration process for locating an alt route or alt path to reroute the traffic that was being carried by link 36 between nodes 4 and 8.

Figure 5A:
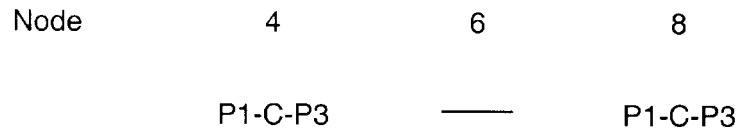
FIGS. 5A–5C are respective illustrations of the connect/disconnect operations performed by the custodial and tandem nodes for the different topologies of the network shown in FIGS. 1, 2 and 3.

Upon detection of the AIS and the expiration of the validation timers as discussed in above-referenced application having docket No. RIC-95-005, each of nodes 4 and 8 first disconnects its connection to the failed link 36. This is done by reconfiguring the cross-connections within the matrix of the cross-connect switch. For example, assume that there is only one circuit, i.e. any physical connection within each of the of interested nodes. In the case of node 2, the connection circuit is 2L. In node 4 the connecting circuit is 4L. In node 8, the circuit is 8L. In node 10, the circuit is 10L. A cross-connect circuit 6L likewise is shown in node 6. In any event, circuit 4L which in the normal state is connected between ports P1 and P3 (see FIG. 5A) is first disconnected from port P3, the site where the faulty or malfunctioned OC-12 link 36 is connected. Thereafter, circuit 4L is reconnected to port P2 of node 4. In other words, port P1 acts as a hinge from which circuit 4L gets pivoted from port P3 to port P2.

Figure 5B:
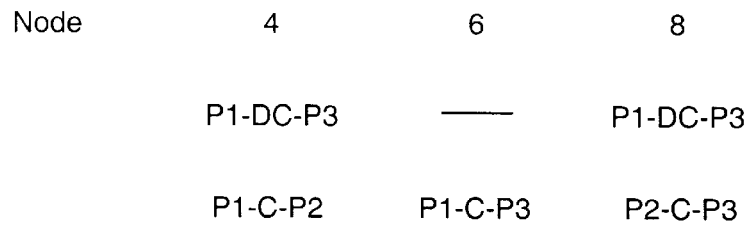

Those two operations of disconnecting the cross-connection between ports P1 and P3 and the cross-connecting of port P1 to port P2 for node 4 are represented as separate operations in FIG. 5B. Similarly, the same two connect/disconnect operations are performed in node 8 so that circuit 8L is first disconnected from port P1 and then reconnected to port P2, all the while its other end being connected to port P3. The two connect/disconnect operations of node 8 are also shown in FIG. 5B. Thus, for both of the custodial nodes, there is a port at which the cross-connect link within the switch is pivoted. That port may be referred to as the hinged point or port. For example, port P1 is the hinged point for node 2 while port P3 is the hinged point for node 8.

In FIG. 2, the cross-connection of port P1 to P2 in node 4 and the cross-connection of port P3 to port P2 in node 8 are of course predicated on the assumption that the alt route found between the custodial nodes or sender/chooser nodes 4 and 8 is via node 6. As shown, there are two working links W1 and W2, as well as a spare link S, connecting node 4 to node 6. Likewise, two working links W1 and W2 and a spare link S connect node 6 to node 8. Thus, with the restoration process as described in the aforenoted referenced related applications, assuming that the respective spare links S between nodes 4 and 6 and nodes 6 and 8 are available, an alt route is established between nodes 4, 6 and 8 to replace the failed link 36.

In other words, the communications path for the FIG. 2 embodiment network extends from working link 44 to node 2 through cross-connect link 2L to working link 38 to node 4. At node 4, the path continues by means of cross-connect link 4L from port P1 to port P2 and is connected to node 6 by means of the spare link between nodes 4 and 6. In node 6, with the cross-connection of link 6L from port P1 to port P3, the path is extended from node 6 to the spare link connecting node 6 to node 8. Since cross-connect link 8L in node 8 is now cross-connected from port P2 to port P3, the path is further extended from node 8 onto working link 40 where it extends to node 10 across the cross-connect link 10L between ports P1 and P3 thereof, and out onto working link 42 and thereafter some other nodes in the network.

Accordingly, as shown in FIG. 5B, there have been two connect/disconnect operations performed in each of the custodial nodes, namely nodes 4 and 8. These operations are indicated by "DC" and "C", designating disconnect and connect, respectively. For the tandem node 6 through which the alt route passes, there has been one operation, namely a cross-connection between ports P1 and P3. See FIG. 5B.

As mentioned previously, OSS 22 continues to monitor the goings on of each of the nodes of the network. Thus, the different connections and disconnections are reported to OSS 22 and are recorded as a map stored in for example memory 22M. For the exemplar configuration shown in FIG. 2, therefore, OSS 22 knows that there has been an alternate route found through which disrupted traffic can now pass.

Given that the distributed restoration scheme is capable of locating the fault, and given that it is desirable to maintain a maximum spare capacity so that subsequent disruption of traffic may also be restored expeditiously, the failed link 36 would most likely be repaired quickly. Once the malfunctioned connection has been repaired, to restore the spare capacity to the state that it was in before alternate route 4-6-8 (from node 4 to node 6 to node 8) was established, the network has to be reconfigured or reverted back to the topology it had prior to the disruption. This is done by OSS 22 issuing some "patch and roll" commands to restore the traffic across now repaired link 36.

In essence, the patch and roll command sent out by OSS 22 is used by each node to perform a particular operation for reverting its state to the configuration it had prior to the restoration process. First, OSS 22, more specifically processor 22P thereof, is cognizant that the custodial nodes are the nodes that had performed two operations, as illustrated in FIG. 5B. In addition, the tandem nodes that form part of the alternate path are nodes that had performed a single operation, namely cross-connecting specific pairs of ports in the cross-connect switch. Thus, according to FIG. 5B, since the custodial nodes are nodes 4 and 8, respective patch and roll commands are sent by OSS 22 via lines 26 and 30 to nodes 4 and 8. Each of these commands informs the node it addresses to disconnect its earlier cross-connection, for example from port P1 to P2 in node 4 and from port P3 to P2 in node 8. Thereafter, a second operation is taken in each of nodes 4 and 8 so that each of those nodes is once more connected to link 36. This second operation of course is exactly the inverse of what was recorded earlier during the restoration process. Putting it differently, in node 4, given that port P1 was disconnected from port P3 before, the inverse now takes place; that is, the cross-connection is patched and rolled from ports P1–P2 to P1–P3. Likewise, in node 8, since there was a disconnection between ports P1 and P3, the patch and roll command from OSS 22 now instructs node 8 to cross-connect link 8L from port P3 to port P1. Once the respective cross-connections are made in nodes 4 and 8, the original route extending from node 2 to node 4 to node 8 to node 10 (2-4-8-10) is reestablished. Traffic accordingly is restored to link 36 of the original route.

Oftentimes, before the reestablishment of the original route, to ensure that failed link 36 has indeed been restored, an integrity check of link 36 is performed. This verification of the integrity or functionality of the restored path is taught in the above referenced related application entitled "Automated Path Verification for SHN-Based Restoration".

In addition, once the original route is restored, signals, in the form of alarm clearing messages, are sent respectively from nodes 4 and 8 to OSS 22 for recordation. Thereafter, having been assured that failed link 36 is now fully repaired and the original route restored, OSS 22 sends a command to node 6 to disconnect the cross-connection between ports P1 and P3. This command effects an operation that is inverse of the operation shown in FIG. 5B for node 6, namely the connection of ports P1 to P3 for the alt route. Thus, to revert the network back to the topology it had prior to the failure, a single patch and roll command involving two inverse operations at each of the custodial nodes and a single inverse operation at the tandem node is performed.

Figure 3:
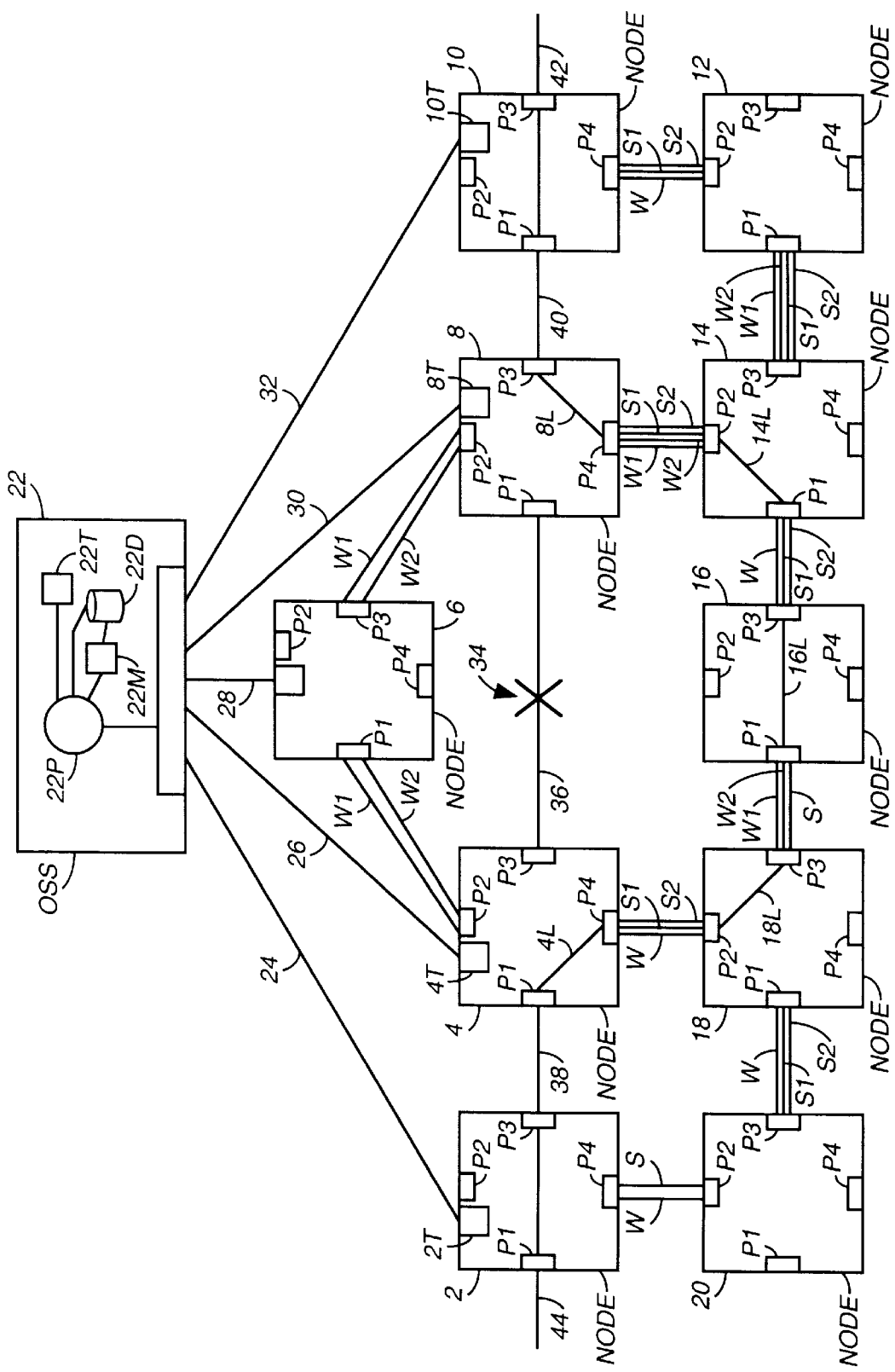
FIG. 3 is another illustration of the partial network of FIG. 1 showing a second embodiment of the invention in which the alt route has multiple tandem nodes.
Figure 4A:
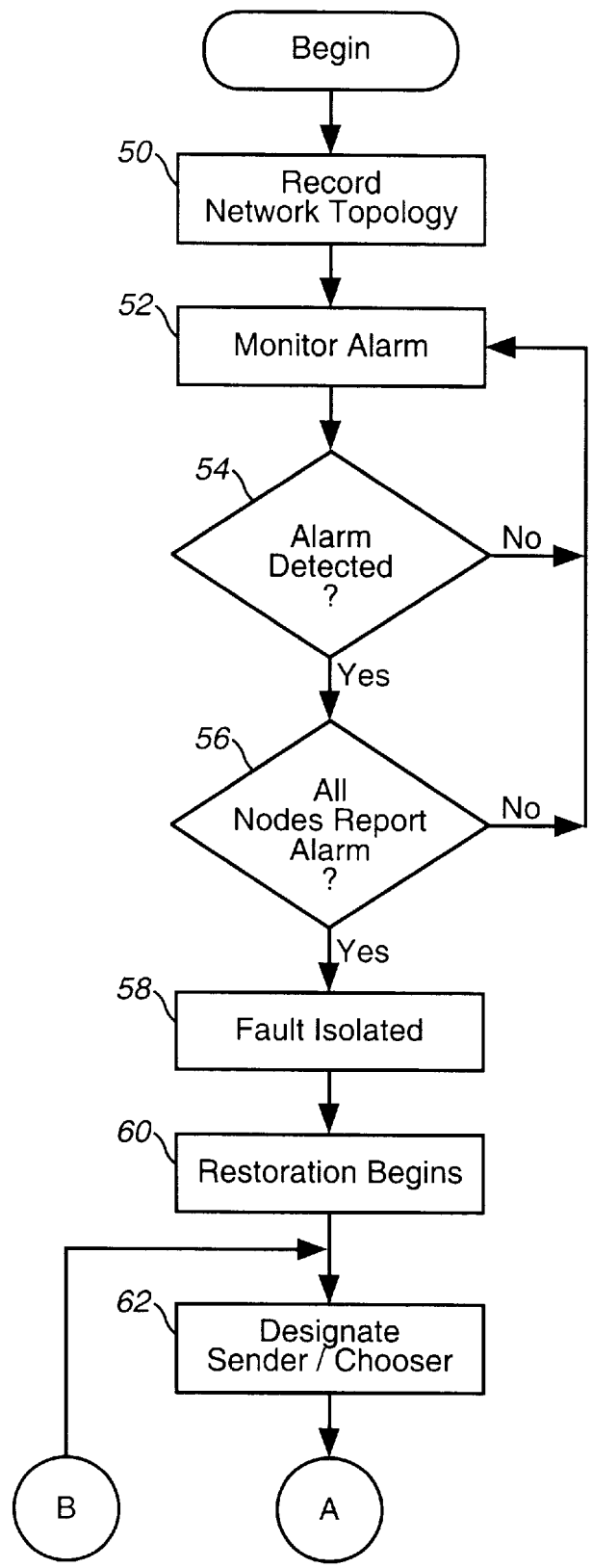
FIGS. 4A–4D together provide a flow chart for explaining the operation of the instant invention.
Figure 4B:
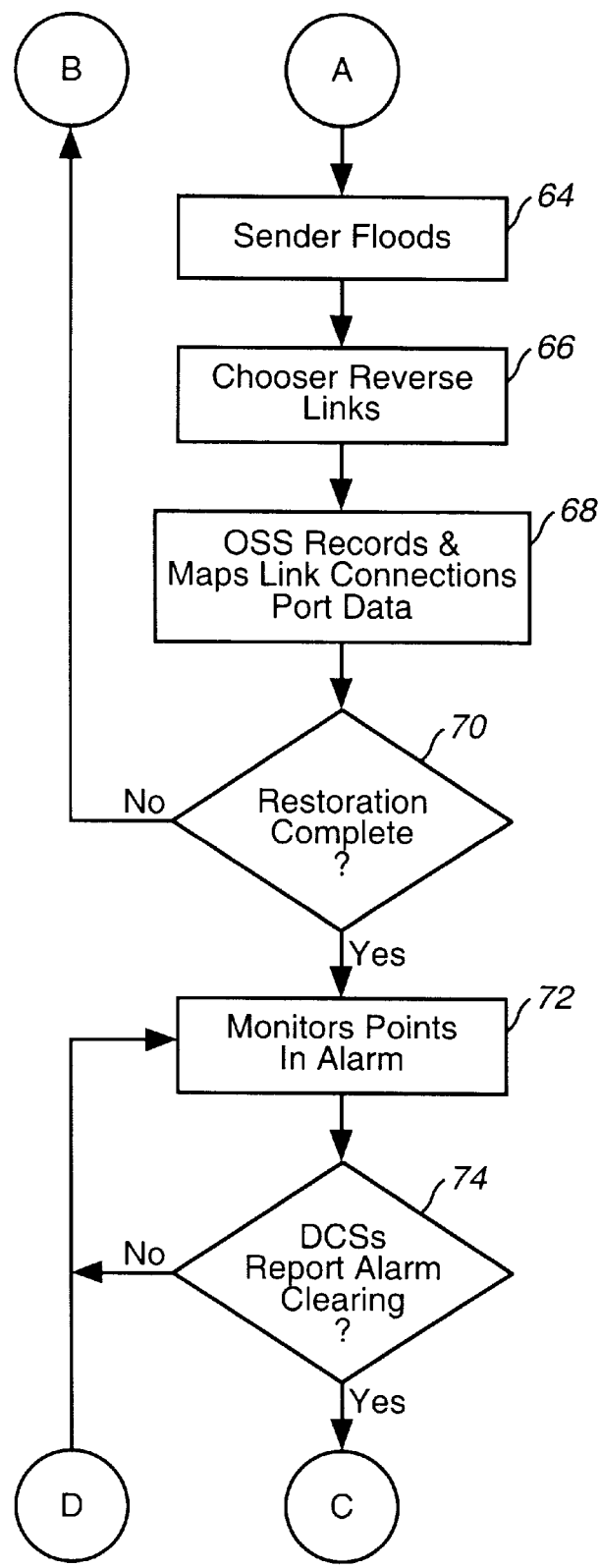
Figure 4C:
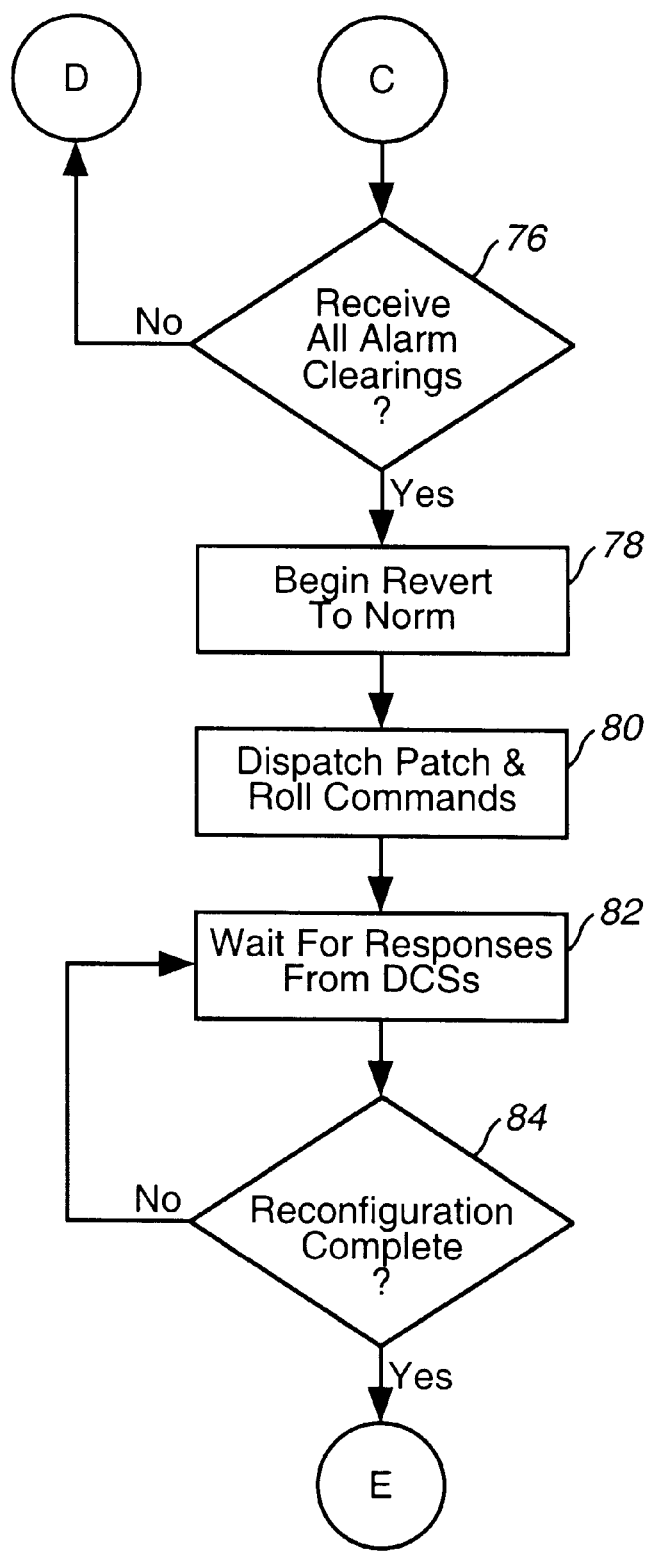
Figure 4D:
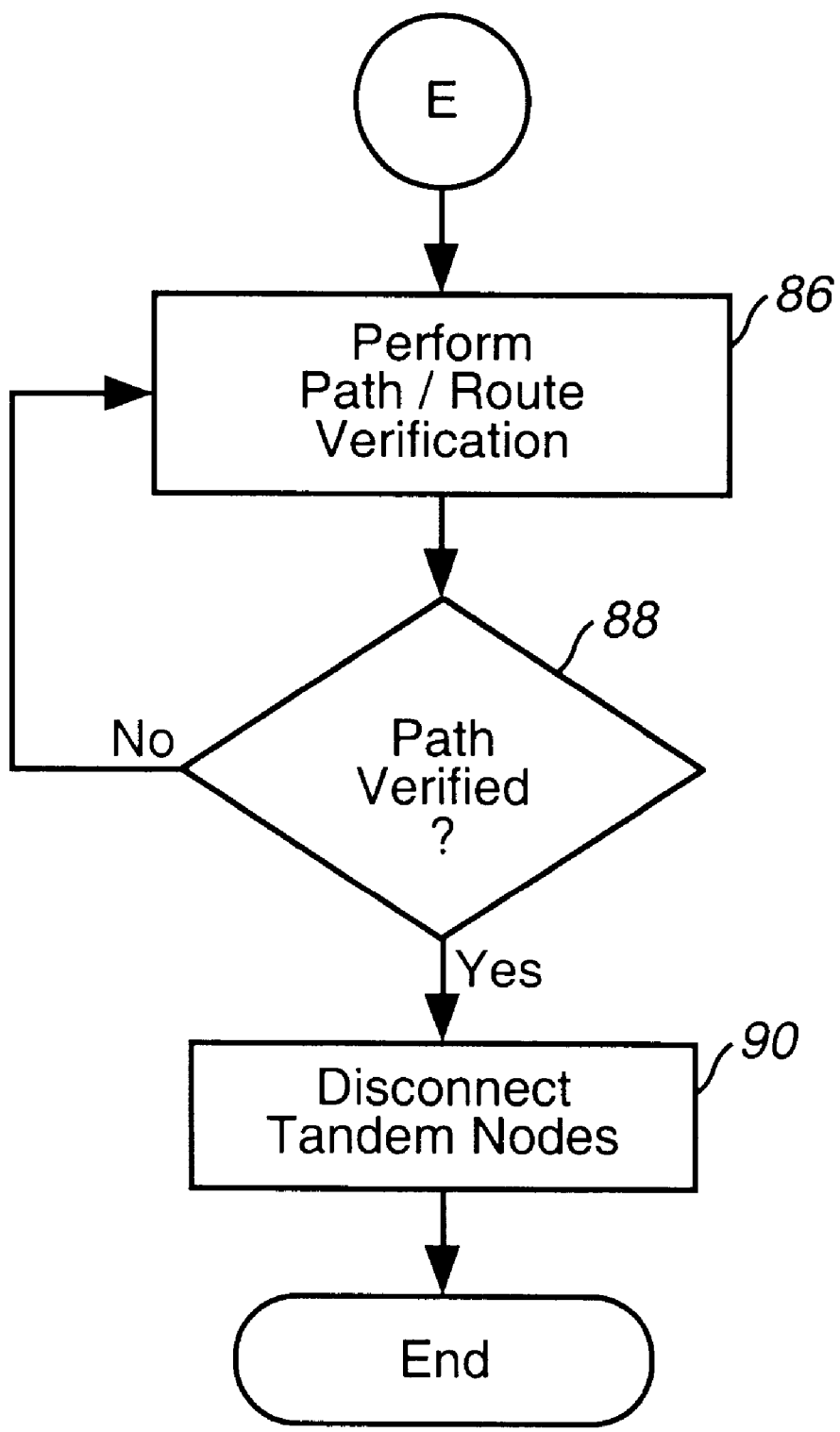

A second embodiment of the instant invention is shown in FIG. 3 where the alt route includes not one but several tandem nodes. For the FIG. 3 embodiment, note that there are only two working links W1 and W2 respectively connecting node 4 to node 6 and node 6 to node 8. In other words, when performing the restoration process, sender node 4 (assuming node 4 is the sender and node 8 the chooser) could not send any flooding messages to node 6. Rather, as shown, the only node to which it can send flooding messages is adjacent node 18 which is shown to have two spare links S1 and S2. Given that there is spare capacity between nodes 18 and 16, nodes 16 and 14 and nodes 14 and 8, reverse linking messages are returned from chooser node 8 to sender node 4 to thereby reserve and establish an alt route, namely route 4-18-16-14-8, shown in FIG. 3. For this alt route, it is assumed that only one of the two available spare links S1 and S2 connecting nodes 4 and 18 is used. Ditto for the spare links S1 and S2 connecting nodes 14 and 8.

The same types of signals and messages are of course sent by each of the nodes to OSS 22 and recorded thereby. For the FIG. 3 embodiment network, however, instead of one tandem node, there are now multiple tandem nodes, namely nodes 14, 16 and 18. The respective operations performed to find the alt route in each of the tandem nodes, as well as custodial nodes 4 and 8, are recorded in OSS 22 and illustrated in FIG. 5C. As shown, cross-connect link 4L, being hinged to port P1, is disconnected from port P3 and pivotally connected to port P4 in node 1. Similarly, cross-connect link 8L, hinged at port P3, gets disconnected from port P1 and reconnected to port P4 in node 8. Also, cross-connect link 14L connects port P2 to port P1 in node 14, cross-connect link 16L connects port P3 to P1 in node 16, and cross-connect link 18L connects port P3 to P2 in node 18.

Figure 5C:
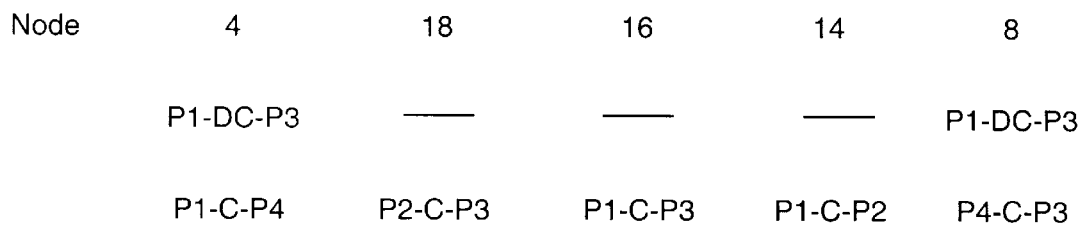

Alarms clear once malfunctioned working link 36 is repaired, upon receipt of the repaired signal, OSS 22 sends to each of the custodial nodes 4 and 8 a command to effect the inverse of the operations recorded in FIG. 5C. Accordingly, cross-connect link 4L of node 4 is patched and rolled from port P4 to port P3. Similarly, cross-connect link 8L is patched and rolled from port P4 to port P1 in node 8. Upon further receipt of the reconnect signals from nodes 4 and 8, an automated path verification is performed to ensure that link 36 has indeed been repaired and that traffic can now flow smoothly across the original path of 2-4-8-10. Once the integrity of the path is established, OSS 22 sends the appropriate command to tandem nodes 14, 16 and 18 to order each of those tandem nodes to perform the inverse of the respective operations shown in FIG. 5C. In other words, cross-connect 14L is disconnected between ports P1 and P4 in node 14, cross-connect link 16L is disconnected between ports P1 and P3 in node 16, and cross-connect link 18L is disconnected between ports P2 and P3 in node 18.

The operation of the instant invention, as illustrated by the flow diagram of FIGS. 4A to 4D, is discussed hereinafter.

In operation, the topology of the network is first recorded by OSS 22 and mapped for example in memory 22M or database 22D. This is shown in block 50. Thereafter, OSS 22 monitors for alarms from any of the nodes of the network, as indicated by block 52. Whether an alarm is detected is indicated at block 54. If no alarm is detected, the process return to block 52. If an alarm is detected, the process proceeds to block 56 for a determination of whether an alarm has been received from all nodes. If not all nodes have reported alarm, the process returns to block 52 to await further alarms.

If all of the concerned nodes report alarm, the process proceeds to the beginning of the restoration process, i.e. isolate the fault per block 58. Thereafter, distributed restoration begins in block 60. Block 62 indicates that the sender and chooser nodes are designated. Thereafter, the sender node sends flooding messages to its adjacent nodes for propagation throughout the network in block 64. Upon receipt of a flooding message, the chooser node sends out reverse link messages, as shown in block 66. The various interconnections among the nodes and the internal cross-connections between the ports in each of the nodes (or cross-connect switch) are recorded and mapped by OSS 22, as indicated per block 68. Whether or not the restoration is completed is determined in block 70. If the restoration has not yet been completed, the process returns to the beginning of the restoration for further processing. If the restoration is completed, the process proceeds to block 72 where OSS 22 continues to monitor for the different alarms from the various nodes.

In block 74, a determination is made on whether any alarm clearing signals have been received from any of the DCSs. If there has not been any alarm clearing signals, the process continues to monitor for alarm. If there are reported alarm clearing signals, the process proceeds to block 76 to further determine whether all of the alarm clearing signals have been received. If not all alarm clearing signals have been received as for example from the custodial nodes, then OSS 22 once again waits and monitors for additional alarm clearing signals from the DCSs.

If OSS 22 has received what it perceives to be all alarm clearing signals per block 76, the process to revert the topology of the network back to its normal state begins in block 78. To effect the revert process, patch and roll commands are sent to the respective nodes that are involved per block 80. OSS 22 next waits for any responses from the DCSs as to whether the patch and roll commands have been carried out per block 82. A determination then is made on whether the reconfiguration, or the reversion, of the topology of the network to its normal state has been completed per block 84. If the reversion has not been completed, the process will continue to wait for additional responses from the different DCSs. If the reversion process is completed, a path/route verification is performed in block 86 to further confirm that the reverted network topology is valid. The verification of the integrity or functionality of the path or original route is determined in block 88. If the integrity of the path is not verified, a further path verification is performed. Once the path is verified, the respective cross-connections of the appropriate ports within each DCS of the tandem nodes that were done during the restoration process to find the alt route are disconnected, per block 90.

Inasmuch as the present invention is subject to many variations, modifications and changes in detail, it is intended that all matter described throughout the specification and shown in the accompanying drawings be interpreted as illustrative only and not in a limiting sense. Accordingly, it is intended that the present invention be limited only by the spirit and scope of the herein appended claims.

What is claimed is:

1. In a telecommunications network having a plurality of nodes interconnected by a plurality of working and spare links, after functionality of at least one failed working link is restored by a distributed restoration scheme, a method of automatically reconfiguring said network to the topology it had before said one working link failed, comprising the steps of:

(a) identifying each of the nodes having performed two cross-connect operations for rerouting traffic traveling on a route including said one failed working link to an alternate route as custodial nodes bracketing said one failed working link;

(b) identifying at least one node to which respective connections via corresponding spare links were made by said custodial nodes to establish said alternate route when said one working link failed as a tandem node;

(c) identifying in each of said custodial nodes the port to which one end of said failed working link is connected, the port to which one of said respective spare links to said tandem node is coupled, and the port through which traffic on said route is routed to other nodes of said network; and (d) disconnecting said traffic routed through port from said spare link coupled port and cross-connecting said traffic routed through port to said failed working link connected port in each of said custodial nodes.

2. Method of claim 1, wherein said two cross-connect operations further comprises the steps of:

disconnecting said failed working link connected port to said traffic routed through port; and cross-connecting said traffic routed through port to said spare link coupled port.

3. Method of claim 1, further comprising the steps of:

verifying said functionality having been restored to said one failed working link; and using said restored one failed working link to reestablished said route.

4. Method of claim 1, further comprising the step of:

disconnecting any cross-connection made in said tandem node for establishing said alternate route when said one working link failed.

5. Method of claim 3, further comprising the step of:

disconnecting any cross-connection made in said tandem node for establishing said alternate route when said one working link failed.

6. Method of claim 1, before any of steps (a) to (d), further comprising the steps of:

monitoring respective statuses from each of said custodial and tandem nodes; and detecting from each of said custodial nodes an indication that said functionality has been restored in said failed working link.

7. Method of claim 1, further comprising the steps of:

storing in a memory data representative of said network including the identity of each of said nodes, the cross-connect operations performed by each of said nodes, the respective connections of working and spare links to the respective ports in each of said nodes, and the identity of the respective ports in each of said nodes.

8. In a telecommunications network having a plurality of nodes interconnected by a plurality of working and spare links, after functionality of at least one failed working link is restored by a distributed restoration scheme, a method of automatically reconfiguring said network to the topology it had before said one working link failed, comprising the steps of:

(a) identifying each of the nodes having performed two cross-connect operations for rerouting traffic traveling on a route including said one failed working link to an alternate route as custodial nodes bracketing said one failed working link;

(b) identifying the plurality of nodes along said alternate route as tandem nodes, each of said tandem nodes having respective spare link ports for interconnecting with each other and communicatively coupling to said custodial nodes;

(c) identifying in each of said custodial nodes a one port to which one end of said failed working link is connected, an other port to which the tandem node adjacent said each custodial node is communicatively coupled, and an another port through which traffic on said route is routed to any other node of said network; and (d) disconnecting said another port from said other port and cross-connecting said another port to said one port in each of said custodial nodes.

9. Method of claim 8, wherein said two cross-connect operations further comprises the steps of:

disconnecting said one port from said another port; and cross-connecting said another port to said other port.

10. Method of claim 8, further comprising the steps of:

verifying said functionality having been restored to said one failed working link; and using said restored one failed working link to reestablished said route.

11. Method of claim 8, further comprising the step of:

disconnecting any cross-connection made in any of said tandem nodes for establishing said alternate route when said one working link failed.

12. Method of claim 8, before any of steps (a) to (d), further comprising the steps of:

monitoring respective statuses from each of said custodial and tandem nodes; and detecting from each of said custodial nodes an indication that said functionality has been restored in said failed working link.

13. Method of claim 8, further comprising the steps of:

storing in a memory data representative of said network including the identity of each of said nodes, the cross-connect operations performed by each of said nodes, the respective connections of working and spare links to the respective ports in each of said nodes, and the identity of the respective ports in each of said nodes.

14. In a telecommunications network having a plurality of nodes interconnected by a plurality of working and spare links, after functionality of at least one failed working link is restored by a distributed restoration scheme, a method of automatically reverting said network to the topology it had before said one working link failed, comprising the steps of:

(a) identifying each of the nodes having performed two cross-connect operations for rerouting traffic traveling on a route including said one failed working link to an alternate route as custodial nodes bracketing said one failed working link;

(b) identifying as tandem nodes each of the nodes having performed one cross-connect operation for functioning as part of said alternate route to accept rerouted traffic, said tandem nodes interconnected with each other, the tandem node at the respective ends of said alternate route being coupled to the one of said custodial nodes adjacent thereto;

(c) identifying in each of said custodial nodes a one port to which one end of said failed working link is connected, an other port to which said tandem node adjacent said each custodial node is coupled, and an another port through which traffic on said route is routed to any other node of said network; and (d) disconnecting said another port from said other port and cross-connecting said another port to said one port in each of said custodial nodes.

15. Method of claim 14, wherein said two cross-connect operations performed by each of said custodial nodes further comprises the steps of:

disconnecting said one port from said another port; and cross-connecting said another port to said other port.

16. Method of claim 14, wherein said one cross-connect operation performed by each of said tandem nodes comprises the step of:

cross-connecting a port coupled to an incoming spare link to a port coupled to an outgoing spare link in said each tandem node.

17. Method of claim 14, further comprising the steps of:

verifying said functionality having been restored to said one failed working link; and using said restored one failed working link to reestablished said route.

18. Method of claim 14, further comprising the step of:

disconnecting said one cross-connection operation made in any of said tandem nodes for establishing said alternate route when said one working link failed.

19. Method of claim 14, before any of steps (a) to (d), further comprising the steps of:

monitoring respective statuses from each of said custodial and tandem nodes; and detecting from each of said custodial nodes an indication that said functionality has been restored in said failed working link.

20. Method of claim 14, further comprising the steps of:

storing in a memory data representative of said network including the identity of each of said nodes, any cross-connect operation performed by each of said nodes, the respective connections of working and spare links to the respective ports in each of said nodes, and the identity of the respective ports in each of said nodes.

21. In a telecommunications network having a plurality of nodes interconnected by a plurality of working and spare links, after functionality of at least one failed working link is restored by a distributed restoration scheme, a method of automatically reverting said network to the topology it had before said one working link failed, comprising the steps of:

(a) identifying each of the nodes having performed two cross-connect operations for rerouting traffic traveling on a route including said one failed working link to an alternate route as custodial nodes bracketing said one failed working link;

(b) identifying at least one node having performed one cross-connect operation for functioning as part of said alternate route a tandem node, said tandem node having respective end ports each coupled to a spare link connecting one of said custodial nodes;

(c) identifying in each of said custodial nodes a one port to which one end of said failed working link is connected, an other port to which said spare link coupled to said tandem node is connected, and an another port through which traffic on said route is routed to any other node of said network; and (d) disconnecting said another port from said other port and cross-connecting said another port to said one port in each of said custodial nodes.

22. Method of claim 21, wherein said two cross-connect operations performed by each of said custodial nodes further comprises the steps of:

disconnecting said one port from said another port; and cross-connecting said another port to said other port.

23. Method of claim 22, wherein said one cross-connect operation performed by said tandem node comprises the step of:

cross-connecting a port coupled to an incoming spare link to a port coupled to an outgoing spare link in said tandem node.

24. Method of claim 22, further comprising the steps of:

verifying said functionality having been restored to said one failed working link; and using said restored one failed working link to reestablished said route.

25. Method of claim 22, further comprising the step of:

disconnecting said one cross-connection operation made in said tandem node for establishing said alternate route when said one working link failed.

26. Method of claim 22, before any of steps (a) to (d), further comprising the steps of:

monitoring respective statuses from each of said custodial and tandem nodes; and detecting from each of said custodial nodes an indication that said functionality has been restored in said failed working link.

27. Method of claim 22, further comprising the steps of:

storing in a memory data representative of said network including the identity of each of said nodes, any cross-connect operation performed by each of said nodes, the respective connections of working and spare links to the respective ports in each of said nodes, and the identity of the respective ports in each of said nodes.

28. In a telecommunications network having a plurality of node switch means interconnected by a plurality of working and spare links, after functionality of at least one failed working link is restored by a distributed restoration scheme, a system for automatically reverting said network to the topology it had before said one working link failed, comprising:

two custodial node switch means bracketing said one failed working link each having performed two cross-connect operations for rerouting traffic traveling on a route including said one failed working link to an alternate route;

a plurality of tandem node switch means each having performed one cross-connect operation for functioning as part of said alternate route to accept rerouted traffic, said tandem node switch means interconnected with each other, the tandem node switch means at the respective ends of said alternate route being coupled to the one of said custodial node switch means adjacent thereto;

each of said custodial node switch means including a one port to which one end of said failed working link is connected, an other port to which said tandem node switch means adjacent said each custodial node switch means is coupled, and an another port through which traffic on said route is routed to any other node of said network;

each of said custodial node switch means disconnecting said another port from said other port and cross-connecting said another port to said one port for reverting said network to said topology.

29. System of claim 28, wherein each of said custodial node switch means performs said two cross-connect operations by disconnecting said one port from said another port and cross-connecting said another port to said other port.

30. System of claim 28, wherein each of said tandem node switch means performs said one cross-connect operation by cross-connecting a port coupled to an incoming spare link to a port coupled to an outgoing spare link in said each tandem node switch means.

31. System of claim 28, further comprising:

control means for verifying said functionality has been restored to said one failed working link and using said restored one failed working link to reestablished said route.

32. System of claim 28, further comprising:

control means for disconnecting said one cross-connection operation made in any of said tandem node switch means for establishing said alternate route when said one working link failed.

33. System of claim 28, further comprising:

control means for monitoring respective statuses from each of said custodial and tandem node switch means and detecting from each of said custodial node switch means an indication that said functionality has been restored in said failed working link.

34. System of claim 28, further comprising:

memory means for storing data representative of said network including the identity of each of said node switch means, any cross-connect operation performed by each of said node switch means, the respective connections of working and spare links to the respective ports in each of said node switch means, and the identity of the respective ports in each of said node switch means, said custodial node switch means performing said disconnecting and cross-connecting operations in response to data stored in said memory means.

35. In a telecommunications network having a plurality of nodes interconnected by a plurality of working and spare links, after functionality of at least one failed working link is restored by a distributed restoration scheme, a system for automatically reconfiguring said network to the topology it had before said one working link failed, comprising:

means for identifying each of the nodes having performed two cross-connect operations for rerouting traffic traveling on a route including said one failed working link to an alternate route as custodial nodes bracketing said one failed working link;

means for identifying at least one node having performed one cross-connect operation for functioning as part of said alternate route a tandem node, said tandem node having respective end ports each coupled to a spare link connecting one of said custodial nodes;

means for identifying in each of said custodial nodes a one port to which one end of said failed working link is connected, an other port to which said spare link coupled to said tandem node is connected, and an another port through which traffic on said route is routed to any other node of said network; and switch means for disconnecting said another port from said other port and cross-connecting said another port to said one port in each of said custodial nodes.

36. System of claim 35, wherein each of said custodial nodes performs said two cross-connect operations by disconnecting said one port from said another port and cross-connecting said another port to said other port.

37. System of claim 35, wherein said tandem node performs said one cross-connect operation by cross-connecting therein a port coupled to an incoming spare link to a port coupled to an outgoing spare link.

38. System of claim 35, further comprising:

means for verifying said functionality having been restored to said one failed working link; and means for using said restored one failed working link to reestablished said route.

39. System of claim 35, wherein said switch means further disconnects said one cross-connection operation made in said tandem node for establishing said alternate route when said one working link failed.

40. System of claim 35, further comprising:

means for monitoring respective statuses from each of said custodial and tandem nodes; and means for detecting from each of said custodial nodes an indication that said functionality has been restored in said failed working link.

41. System of claim 35, wherein each of said nodes is an electronic cross-connect switch.

42. System of claim 35, further comprising:

memory means for storing data representative of said network including the identity of each of said nodes, any cross-connect operation performed by each of said nodes, the respective connections of working and spare links to the respective ports in each of said nodes, and the identity of the respective ports in each of said nodes, said custodial nodes switch means performing said disconnecting and cross-connecting operations in response to data stored in said memory means.

* * * * *